July 20, 1971 — H. L. NORTH, JR — 3,594,130

BLOOD OXYGENATOR

Filed March 24, 1969 — 2 Sheets-Sheet 1

INVENTOR.
HOWARD L. NORTH JR.
BY Norman Friedland
ATTORNEY 3,594,130
BLOOD OXYGENATOR
Howard L. North, Jr., West Simsbury, Conn., assignor to United Aircraft Corporation, East Hartford, Conn.
Filed Mar. 24, 1969, Ser. No. 809,790
Int. Cl. A61m 1/03
U.S. Cl. 23—258.5                                    2 Claims

ABSTRACT OF THE DISCLOSURE

A thin film blood oxygenator usable with hyperbaric oxygen is constructed in two flat spaced plates sandwiching a pair of semipermeable membranes supported by glass beads whereby blood is passed between the semipermeable membranes and oxygen is passed over the outer surface of the membranes and between the glass beads. Channels formed in the flat plate serve to distribute the blood and oxygen in a predetermined flow path.

BACKGROUND OF THE INVENTION

This invention relates to blood oxygenation apparatus and particularly to the construction thereof.

This invention pertains to the type of blood oxygenator where the blood is distributed into a thin film without an interface between the blood and the oxygen. A semipermeable membrane between the blood and oxygen serves to pass the oxygen and carbon dioxide to and from the blood similar to the manner in which the mammalian lung operates. In the present invention the blood oxygenator is intended to permit blood oxygenation with a minimum of exposed membrane surface and with a minimum blood pressure drop. Inasmuch as the low surface area and pressure drop are obtained, a substantially reduced level of blood protein denaturation, trauma, and hemolysis is evidenced. Thus, the oxygenator should therefore be suitable for long term oxygenation well beyond the typical four to six hour limit of current devices.

The technique of passing oxygen and blood on either side of the semipermeable membrane is well known in the art and is exemplified by the patent to William R. Koreski, 3,212,499, issued on Oct. 19, 1965. This invention relates to a novel construction of an oxygenator that supports the semipermeable membrane in a novel manner. The membrane's supporting surface consists of a number of closely spaced spherical beads mounted on a rigid surface. In the design shown the beads are embedded in an adhesive-backed plastic. The combination is a commercially obtained material. The beads form a support surface which permits large pressure differences between blood and oxygen without damaging membrane stresses and at the same time provides adequate flow area around the beads for the oxygen. In addition, the small cross-sectional area available for the oxygen flow in the presence of the beads will produce turbulent mixing of the gases at the membrane surface and thus promote oxygen uptake by the blood and carbon dioxide release from the blood. The supporting beaded surface is mounted on thick, rigid, flat aluminum plates which permit close membrane spacing to produce a thin blood film. This blood film remains substantially fixed even with high internal blood and/or oxygen pressures. This rigid structure will avoid thick films or preferential channeling of the blood flow both of which reduce efficiency. Since the blood and oxygen sealing member is elastic, it will permit adjustment of the blood film thickness to the value found to be optimum for the conditions encountered. The membrane area is arranged in a form which has a very short path length but which has great width. This low ratio of path length to path width minimizes the blood pressure drop to produce low blood trauma due to hydraulic flow effects. The low membrane stresses and rigid structure permit use with hyperbaric oxygen. This will permit oxygenation with smaller than conventional surface areas and thus reduce blood trauma. Since the oxygenator utilizes a single sandwich of two membrane sheets, such a device is simple to construct and assemble allowing such apparatus to be built rapidly with a minimum of labor cost.

SUMMARY OF INVENTION

The primary object of the present invention is to provide an improved blood oxygenator.

A still further object of this invention is to construct a blood oxygenator by supporting a pair of flat membrane sheets of relatively thin material on glass beads supported by a pair of spaced apart flat plate members so as to form a film of blood and to place the oxygen flow in counter or parallel flow relationship with the blood, such construction being characterized as simple to construct and quick and easy to assemble.

Other features and advantages will be apparent from the specification and claims and from the accompanying drawings which illustrate an embodiment of the invention.

Figure 1:
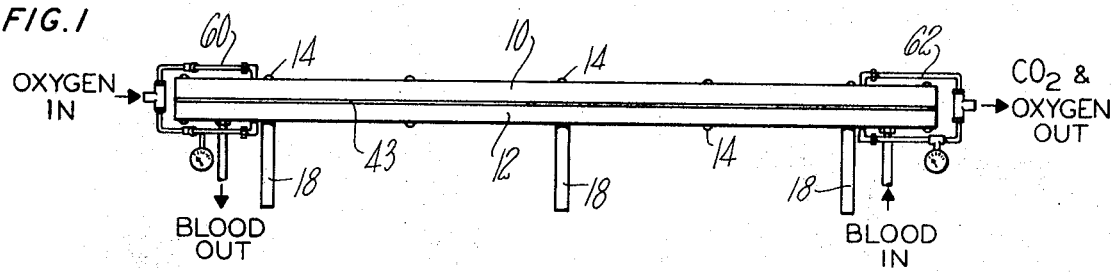
FIG. 1 is a side elevation of the assembled unit.
Figure 3:
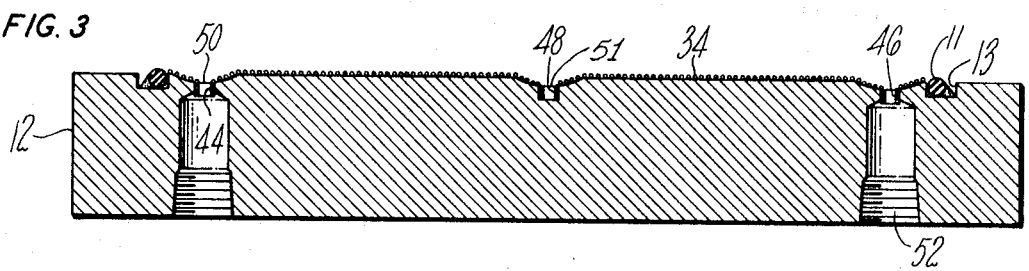
FIG. 3 is a sectional view taken along lines 3—3 of FIG. 2.
Figure 4:
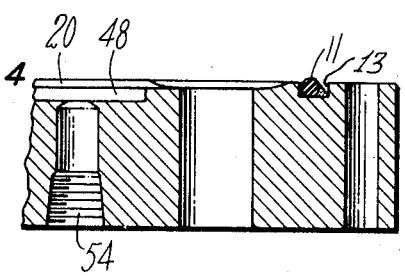
FIG. 4 is a partial sectional view taken along the lines of 4—4 of FIG. 2.
Figure 5:
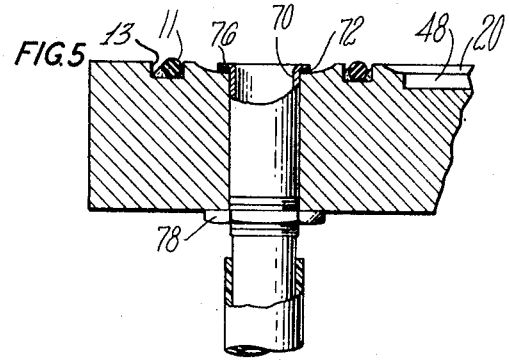
FIG. 5 is a sectional view taken along the lines 5—5 of FIG. 2.

Reference is hereby made to FIGS. 1–6 (inclusive) to describe the preferred embodiment of this invention. The oxygenator comprises top plate 10 suitably and releasably secured to bottom plate 12 by a series of nut and bolt assemblies 14 fitted into the plurality of openings 16 formed around the periphery of the unit. Legs 18 secured to bottom plate 12 extend downwardly and serve to support the unit in a horizontal position. As noted from FIG. 2, top and bottom plates 10 and 12, respectively, are substantially rectangular in shape and are made from suitable rigid material, such as aluminum. An O seal fitted in peripheral groove 13 may be employed to prevent leakage as shown.

The opposing faces of the plates are grooved in a predetermined manner in order to conduct the flow of blood and oxygen to promote maximum oxygenation as will be more fully explained hereinbelow. The plates are formed with a straight through channel 20 formed centrally of the plate and extending from one end substantially through the entire length but terminating just short of the next adjacent channel. This channel consists of a generally U-shaped channel 22 having the base of the U spaced from the end of elongated channel 20 and having each of its legs running parallel therewith. Channel 20 communicates with a blood inlet 23 which serves to direct blood into channel 20 causing it to fill and spill over whereby the flow passes transversely as shown by the indicating arrows into the parallelly spaced leg channels 24 and 26 of the U-shaped channel 22. The blood is there collected and transmitted to the base of the U-shaped channel 22 where it is in communication with an outlet port 28. Since the space between the supporting plates can be adjusted relative to each other, as by incorporating spacer 43 sandwiched therebetween, close membrane spacing is evident thus producing a thin blood film. This blood film remains substantially fixed even with high internal blood and/or oxygen pressures. As a consequence the unit avoids thick films or preferential channeling of the blood flow, either of which can reduce oxygenation effectiveness. Additionally, this structure forms a relatively short path length which has relatively large width which minimizes blood pressure drop and obviously reduces the potential blood trauma. Obviously, such structure is suitable for hyperbaric oxygen.

The membranes are made from sheets of a thin flexible semipermeable material such as tetrafluoroethylene known by its trade name as Teflon or methyl silicone. Teflon of a 0.5 mil thickness has proven to be satisfactory. The sheets 30 and 32 extend coplanar and coextensively with the surfaces of the bottom and top plates so as to snugly follow the contours of the channels. The term semipermeable is defined for the purpose of this explanation as meaning being capable of passing a gaseous medium therethrough relatively freely while essentially preventing the flow of liquid. Obviously the blood passes in the space formed between the two membranes 30 and 32 in the manner described above as indicated in FIG. 6. The membranes are supported to the complementary surfaces of the top and bottom plates by closely spaced spherical beads embedded in an adhesive-backed plastic which is commercially available from Minnesota Mining and Manufacturing Company and bears the trade name "Scotchlite." A suitable sized glass bead of .005" diameter has been used. Alternatively, the surface may be formed by sprinkling glass beads on an adhesive surface applied to the plates 10 and 12.

Figure 6:
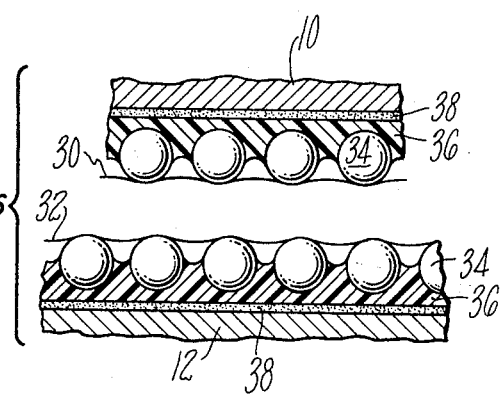
FIG. 6 is an exploded view illustrating the membrane supported by the glass bead structure.
Figure 2:
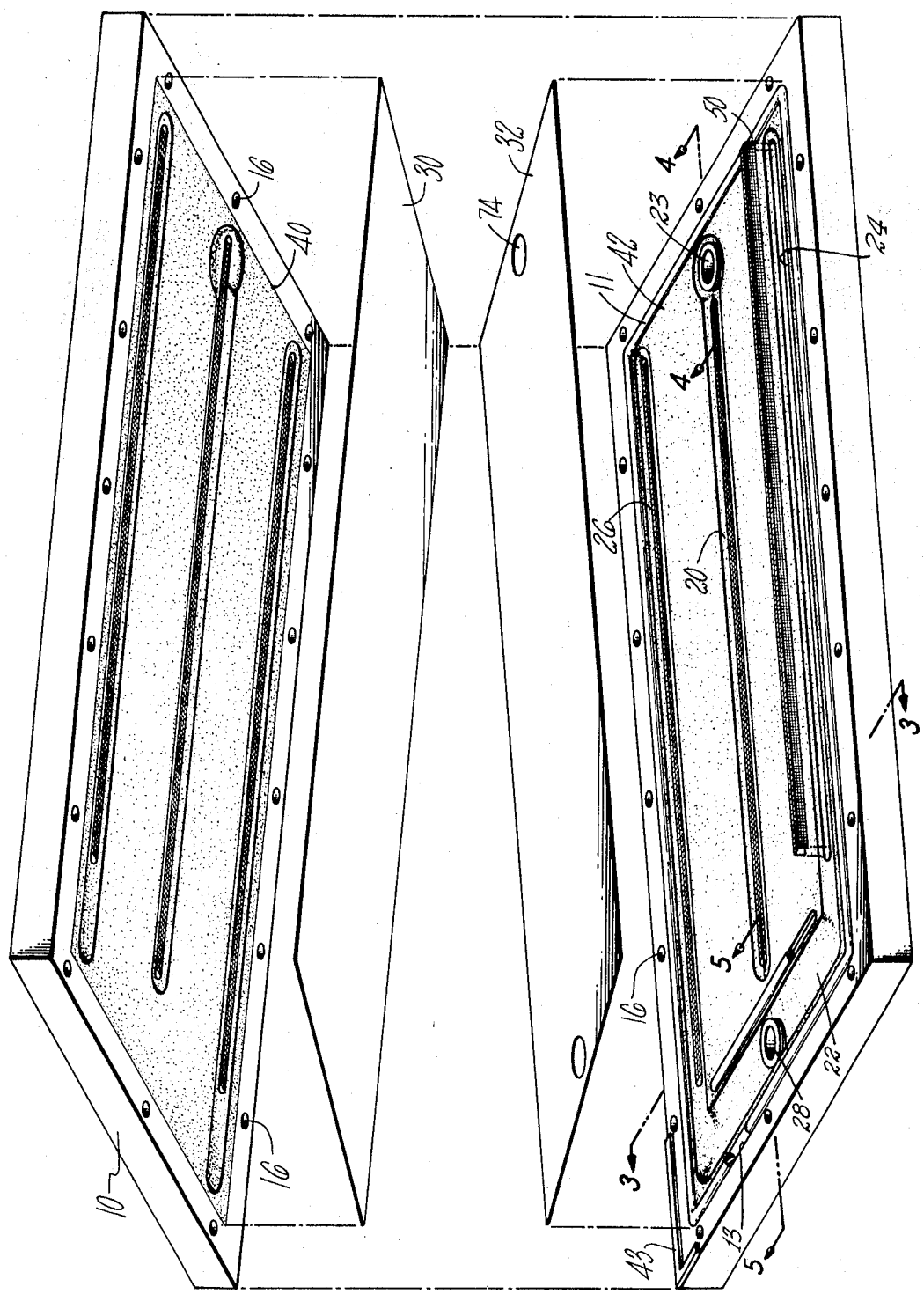
FIG. 2 is an exploded, perspective view showing the construction of the invention.

FIG. 6 better illustrates the details of the supporting structure for the membranes. The glass beads 34 are embedded in a suitable sheet 36 of plastic material treated on its back side with an adhesive 38 which serves to hold the glass bead impregnated plastic sheet to the surface of top and bottom plates 10 and 12 respectively. The supported glass beads are sized so as to substantially overlie and be coextensive with the complementary surfaces of the top and bottom plates as illustrated by reference numerals 40 and 42. Preferably, the beads are disposed in a monolayer relationship on surfaces 40 and 42.

Oxygen is fed to the other face of the membranes between the interstices formed adjacent the glass beads. As noted from FIG. 3, grooves 44, 46 and 48 extending substantially the length of channels 20, 24 and 26, respectively, are formed on the bottom thereof, noting that the width of these grooves are less than the width of the channels. Suitable ports 50, 52, and 54 communicating with the glass beads are formed in the bottom plate as shown. Similar ports are formed in the top plate serving to conduct oxygen to the face of the other membrane. To prevent the membrane from falling into the slot a substantially U-shaped elongated screen element 51 is inserted in each of the slots. The spaces between the ends of screen element 50 and its mating slot are filled with a suitable room temperature vulcanizing polymer, such as Silastic®, to provide continuous support for the membrane.

The oxygen ports of the plates may be suitably connected to an oxygen supply through manifold plumbing generally illustrated by numeral 60. Likewise, the excess oxygen and the carbon dioxide given up by the blood are discharged through similar plumbing 62 connected to ports formed in the top and bottom plates adjacent the groove 48.

The port communicating with the space between the membranes is fitted with a suitable nipple 70 extending through the bottom plate. Gasket 72 surrounding the opening 74 and outer diameter of the nipple fit under the flange 76 formed on the end thereof. Nut 78 threadably engaging threads formed on the outer wall of the nipple secures the nipple in place. Of course, the unit will contain inlet and outlet nipples similarly constructed.

It should be understood that the invention is not limited to the particular embodiments shown and described herein, but that various changes and modifications may be made without departing from the spirit or scope of this novel concept as defined by the following claims.

I claim:

1. A thin-film blood oxygenator comprising a pair of substantially flat-like complementary plate members held in spaced relation, relatively small particles dispersed in random but in close relation to each other firmly affixed to the mating faces of said plate members, said small particles being disposed in a monolayer relationship on said mating surfaces; a pair of semipermeable membranes coplanar and coextensive with the mating faces overlaying the area covered by said small particles, passage means providing inlets and outlets for leading blood into and out of the space between said pair of semipermeable membranes and for leading oxygen on the opposite sides of said semipermeable membranes so that the oxygen flows between adjacent particles, means for retractably securing said plate members to each other, a U-shaped channel formed in the faces of said plates, said passage means including port means formed in one of said plate members communicating with the space between said membranes and the bottom portion of said U-shaped channel, additional channel means extending from adjacent one edge of said plate members to a point spaced from said bottom portion and parallel with the legs of said U-shaped channel, additional port means also formed in said one of said plate members communicating with said space between said membranes and one end of said additional channel means, whereby the blood is fed to said additional channel and flows transversely thereto upon filling and is collected by said U-shaped channel.

2. A thin-film blood oxygenator as claimed in claim 1 wherein elongated recesses extending in the legs of said U-shaped channel are formed to receive oxygen and screen means in said recess supporting said membranes.

References Cited

UNITED STATES PATENTS

| | | | |
|---|---|---|---|
| 2,735,812 | 2/1956 | Van Hoek | 210—321X |
| 3,034,505 | 5/1962 | Sobol | 23—258.5 |
| 3,060,934 | 10/1962 | Claff et al. | 23—285.5 |
| 3,077,268 | 2/1963 | Gobel et al. | 210—321 |
| 3,212,642 | 10/1965 | Kylstra | 210—321 |
| 3,332,746 | 7/1967 | Claff et al. | 23—258.5 |
| 3,367,505 | 2/1968 | Bray | 210—321 |
| 3,412,865 | 1/1968 | Lontz et al. | 23—258.5X |
| 3,413,095 | 11/1968 | Bramson | 23—258.5 |

MORRIS O. WOLK, Primary Examiner
B. S. RICHMAN, Assistant Examiner

U.S. Cl. X.R.

210—321